C. B. JOHNSON.
WHEELBARROW.
APPLICATION FILED SEPT. 10, 1918.

1,312,990. Patented Aug. 12, 1919.

WITNESSES

INVENTOR
C. B. Johnson
BY
ATTORNEYS

UNITED STATES PATENT OFFICE.

CHARLES BROOKS JOHNSON, OF NEW YORK, N. Y.

WHEELBARROW.

1,312,990.     Specification of Letters Patent.     Patented Aug. 12, 1919.

Application filed September 10, 1918. Serial No. 253,445.

*To all whom it may concern:*

Be it known that I, CHARLES BROOKS JOHNSON, a citizen of the United States, and a resident of the city of New York, borough of Manhattan, in the county and State of New York, have invented a new and Improved Wheelbarrow, of which the following is a full, clear, and exact description.

This invention relates to wheelbarrows or similar load carriers, and the invention has to deal more particularly with a yoke device whereby the load can be carried partly or wholly by the shoulders.

The invention has for its general objects to improve the construction and operation of devices of this character so as to be reliable and efficient in use, comparatively simple and inexpensive to manufacture, and so designed as to be adjustable to accommodate the stature of the user.

A more specific object of the invention is the provision of shoulder-engaging members for wheelbarrows, trucks or the like, whereby the load can be carried wholly by the hands, wholly by the shoulders, or partly by both, the attachment being in the form of members connected with the axle of the wheelbarrow or truck and extending upwardly over the handle members and terminating in shoulder-engaging rests or seats, the members of the attachment being adjustably connected with braces, whereby they may be held at any angle.

With such and other objects in view, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of a wheelbarrow with the yoke device;

Figure 1:
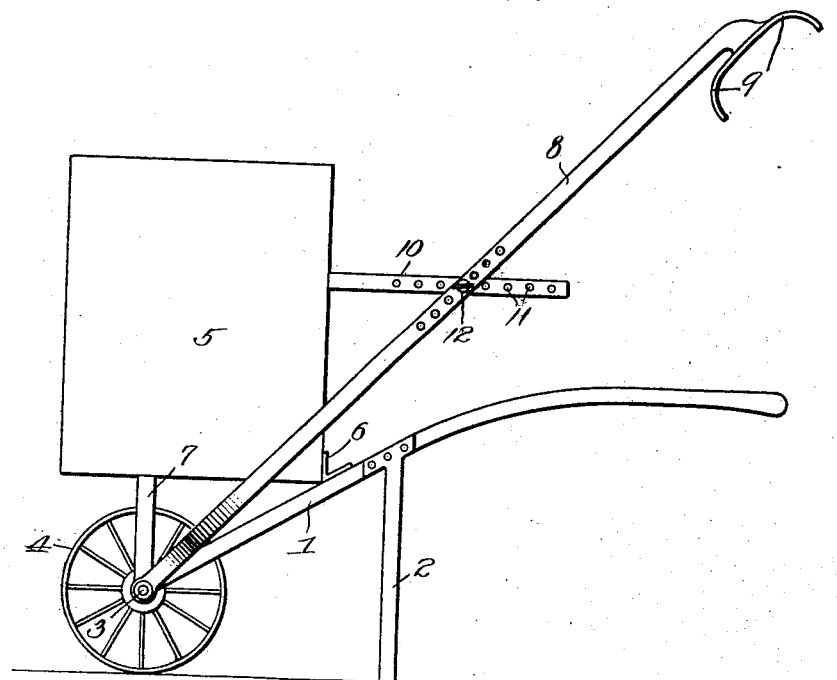
Figure 2:
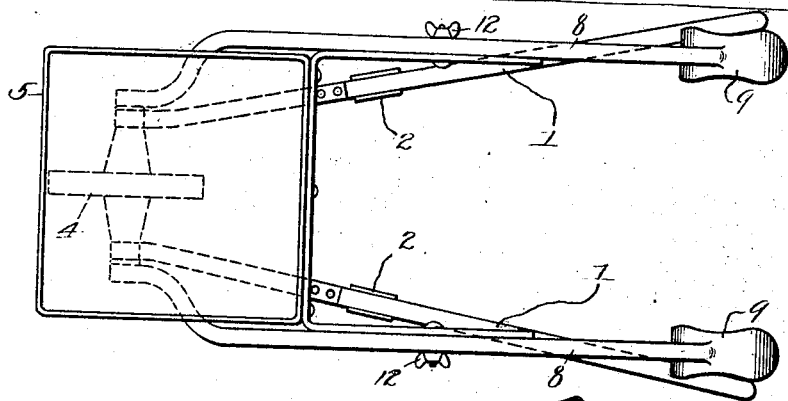
Fig. 2 is a plan view.

Referring to the drawing, 1 designates the side or handle members of a wheelbarrow which are provided with legs or supports 2 and which carry the axle 3, in which is a wheel 4. The body or box 5 is of any suitable construction and arrangement, the same being supported at 6 on the handle members and on a bolster member 7 which straddles the wheel 4 and is carried by the side members 1.

The yoke device comprises a pair of bar-like members 8 disposed at opposite sides of the wheelbarrow with their lower ends attached to the axle 3, and on the upper end of each is a seat 9 so shaped as to comfortably fit the shoulder. These seats engage the top of the shoulders as well as the front, so that the load can be carried by the shoulders as well as pushed forwardly. The members 8 are adjustable with respect to the handle members 1, so as to adapt the yoke attachment to the stature of the person using the wheelbarrow. The body 5 has braces 10 extending rearwardly therefrom which are provided with apertures 11 to receive bolts 12 that pass through registering apertures 15 formed in the yoke members 8, whereby the latter can be shifted to different positions and rigidly held.

Figure 3:
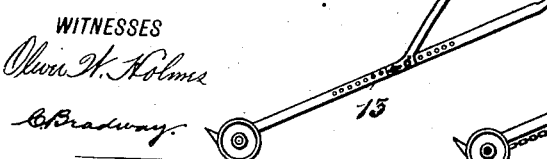
Fig. 3 is a side view of a hand truck equipped with the yoke device.
Figure 4:
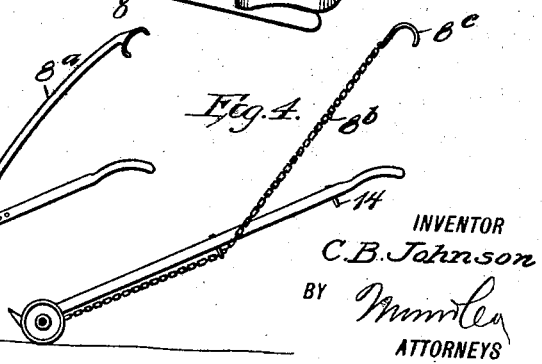
Fig. 4 is a similar view showing a modified form of device.

In Fig. 3 is shown an ordinary hand truck to the side members 13 of which are applied yoke members $8^a$ which can be adjusted to different positions, but instead of rigid members, as in Fig. 3, chains $8^b$ may be attached to the frame of the truck, as in Fig. 4, said chains having shoulder-engaging members or hooks $8^c$ at their upper ends for engaging over the shoulders, whereby the load can be carried by the latter. On the handle members of the truck may be provided loops or eyes 14 into which the hooks $8^c$ can be engaged when they are not in use.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of a load-carrier comprising handle members, a wheel connected therewith, with a shoulder yoke comprising bar-like members connected to the axle of the wheel and adjustable with respect to the handle members, the said bar-like members terminating in seats adapted to be seated on the shoulders of the user of the load carrier.

2. A load carrier comprising an axle, rolling means on the axle, handle members connected with the axle, and shoulder members connected with the axle and terminating in seats adapted to be seated on the shoulders of the user of the load carrier, the said seats being located above the gripping ends of the said handle members to allow simultaneous use of the said handle members and the said shoulder members.

3. A load carrier comprising an axle, rolling means on the axle, handle members connected with the axle, shoulder members connected with the axle and terminating in seats adapted to be seated on the shoulders of the user of the load carrier, the said seats being located above the gripping ends of the said handle members to allow simultaneous use of the said handle members and the said shoulder members, and means for adjusting the shoulder members and the handle members one relative to the other.

CHARLES BROOKS JOHNSON.

Copies of this patent may be obtained for five cents each, by addressing the "Commissioner of Patents, Washington, D. C."